(12) United States Patent
Thinon et al.

(10) Patent No.: US 12,448,495 B2
(45) Date of Patent: Oct. 21, 2025

(54) OPTIMIZED DEPOLYMERIZATION PROCESS BY GLYCOLYSIS OF A POLYESTER COMPRISING POLYETHYLENE TEREPHTHALTE

(71) Applicant: IFP Energies Nouvelles, Rueil-Malmaison (FR)

(72) Inventors: Olivier Thinon, Rueil-Malmaison (FR); Mayara Azin Gondim Paiva, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 718 days.

(21) Appl. No.: 17/791,545

(22) PCT Filed: Dec. 21, 2020

(86) PCT No.: PCT/EP2020/087380
§ 371 (c)(1),
(2) Date: Jul. 8, 2022

(87) PCT Pub. No.: WO2021/140016
PCT Pub. Date: Jul. 15, 2021

(65) Prior Publication Data
US 2023/0049514 A1    Feb. 16, 2023

(30) Foreign Application Priority Data
Jan. 9, 2020  (FR) ...................... 2000182

(51) Int. Cl.
*C08J 11/24*   (2006.01)

(52) U.S. Cl.
CPC ............ *C08J 11/24* (2013.01); *C08J 2367/02* (2013.01)

(58) Field of Classification Search
None
See application file for complete search history.

(56) References Cited

U.S. PATENT DOCUMENTS 10,544,276 B2   1/2020   Charra et al.
2019/0161595 A1  5/2019   Charra et al.

FOREIGN PATENT DOCUMENTS

JP   2002-30035 A    1/2002
WO   2018/007356 A1  1/2018

OTHER PUBLICATIONS

International Search Report dated Apr. 28, 2021 issued in corresponding PCT/EP2020/087380 application (2 pages).

*Primary Examiner* — Amy C Bonaparte
(74) *Attorney, Agent, or Firm* — Millen, White, Zelano & Branigan, P.C; Brion P. Heaney

(57) ABSTRACT

The invention relates to a process of depolymerization of a polyester feedstock comprising PET, which comprises: a) a conditioning step; b) a glycolysis step in the presence of diol; c) a step of separation of the diol, producing at least a gaseous diol effluent, at least a liquid diol effluent and a liquid monomers effluent; g) a step of separating said liquid monomers effluent into a heavy impurities effluent and a prepurified monomers effluent, this step being conducted with a residence time of less than 10 min; e) a step of decolourizing the prepurified monomers effluent, in the presence of at least one adsorbent, and f) a diol purification step, which is supplied with at least a gaseous diol effluent and at least a liquid diol effluent, which are obtained from step c), and which produces a purified diol effluent and one or more impurities effluent(s).

26 Claims, 1 Drawing Sheet

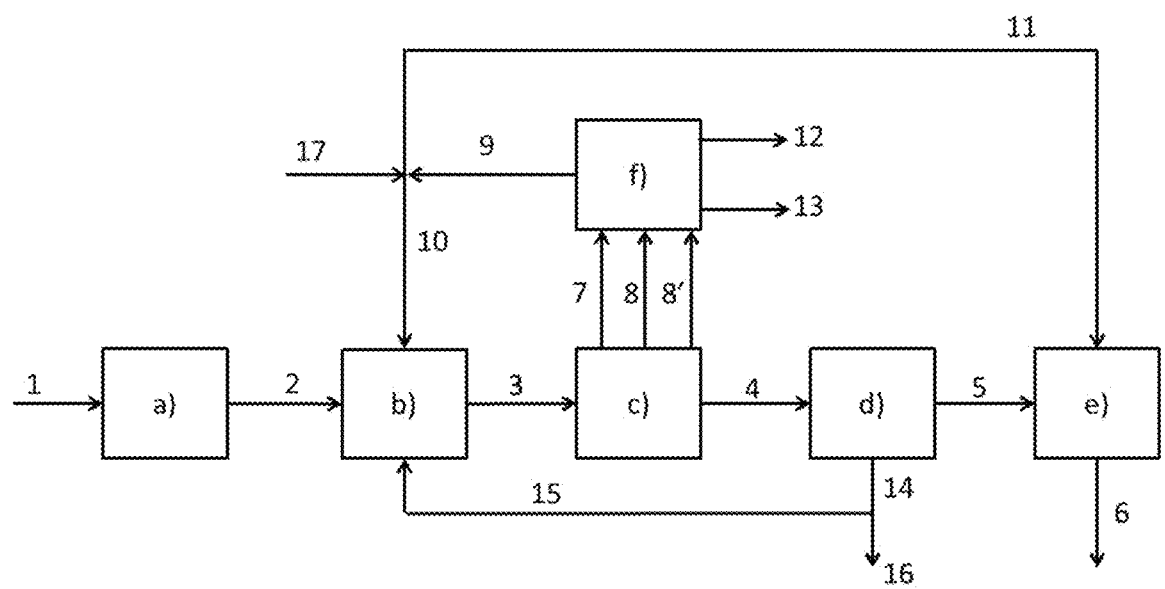

OPTIMIZED DEPOLYMERIZATION PROCESS BY GLYCOLYSIS OF A POLYESTER COMPRISING POLYETHYLENE TEREPHTHALTE

TECHNICAL FIELD

The invention relates to an optimized process of glycolytic depolymerization of a polyester, more particularly the polyester terephthalate comprising polyethylene terephthalate (PET), in the presence of diol, for recycling of said polyester in a polymerization unit. The invention relates more particularly to a process of depolymerization by glycolysis in the presence of diol, more particularly in the presence of ethylene glycol (or monoethylene glycol, MEG), of a polyester feedstock comprising, in particular, at least coloured and/or opaque and/or multilayer PET, with a particular step of purification of the diol effluent recovered after depolymerization, so as to obtain a diol stream, more particularly a purified MEG stream, which can be recycled in particular to the glycolysis reaction step.

PRIOR ART

The chemical recycling of polyester, more particularly of polyethylene terephthalate (PET), has been a subject of numerous studies aimed at breaking down the polyester, recovered in the form of waste, into monomers which will be able to be used again as feedstock for a polymerization process.

Numerous polyesters result from circuits for collecting and sorting materials. In particular, polyester, especially PET, can originate from the collection of bottles, trays, films, resins and/or fibres composed of polyester (such as, for example, textile fibres, tyre fibres). The polyester resulting from collecting and sorting divisions is referred to as polyester to be recycled.

PET to be recycled can be classified into four main categories:
- clear PET, predominantly composed of colourless transparent PET (generally at least 60% by weight) and azure coloured transparent PET, which does not contain pigments and can be used in mechanical recycling processes;
- dark or coloured (green, red, etc.) PET, which can generally contain up to 0.1% by weight of dyes or pigments but remains transparent or translucent;
- opaque PET, which contains a significant amount of pigments at contents typically varying between 0.25% and 5.0% by weight in order to opacify the polymer. Opaque PET is increasingly being used, for example in the manufacture of food containers, such as milk bottles, in the composition of cosmetic, plant-protection or dye bottles;
- multilayer PET, which comprises layers of polymers other than PET or a layer of recycled PET between layers of virgin PET (that is to say, PET which has not undergone recycling), or a film of aluminium, for example. Multilayer PET is used, after thermoforming, to produce packaging such as trays.

The collecting divisions, which supply the recycling divisions, are structured differently depending on the country. They are changing so as to maximize the amount of plastic recycled from waste as a function of the nature and of the amount of the streams and of the sorting technologies. The division for recycling these streams generally consists of a first step of conditioning in the form of flakes during which bales of raw packaging are washed, purified and sorted, ground and then again purified and sorted to produce a stream of flakes generally containing less than 1% by weight of "macroscopic" impurities (glass, metals, other plastics, wood, paper, cardboard, inorganic elements), preferentially less than 0.2% of "macroscopic" impurities and more preferentially still less than 0.05%.

Clear PET flakes can subsequently undergo a step of extrusion-filtration which makes it possible to produce extrudates which can subsequently be reused as a mixture with virgin PET to produce new products (bottles, fibres, films). A step of solid state polymerization under vacuum (known under the acronym SSP) is necessary for food uses. This type of recycling is known as mechanical recycling.

Dark (or coloured) PET flakes can also be recycled mechanically. However, the colouration of the extrudates formed from the coloured streams limits the uses: dark PET is generally used to produce packaging straps or fibres. The outlets are thus more limited in comparison with those of clear PET.

The presence of opaque PET containing pigments at high contents, in PET to be recycled, presents problems to recyclers as opaque PET detrimentally affects the mechanical properties of recycled PET. Opaque PET is currently collected with coloured PET and is found in the coloured PET stream. In view of the development of the uses for opaque PET, the contents of opaque PET in the stream of coloured PET to be recycled are currently between 5-20% by weight and are tending to increase further. In a few years' time, it will be possible to achieve contents of opaque PET in the coloured PET stream of greater than 20-30% by weight. In point of fact, it has been shown that, above 10-15% of opaque PET in the coloured PET streams, the mechanical properties of the recycled PET are detrimentally affected (cf. *Impact du developpement du PET opaque blanc sur le recyclage des emballages en PET* [Impact of the growth of white opaque PET on the recycling of PET packaging], preliminary report of COTREP of May 12, 2013) and prevent recycling in the form of fibres, the main outlet of the industry for coloured PET.

Dyes are natural or synthetic substances which are soluble, in particular in the polyester material, and are used to colour the material into which they are introduced. The dyes generally used have different natures and often contain heteroatoms of O and N type, and conjugated unsaturations, such as, for example, quinone, methine or azo functions, or molecules such as pyrazolone and quinophthalone. Pigments are finely divided substances which are insoluble, in particular in the polyester material, and which are used to colour and/or opacify the material into which they are introduced. The main pigments used to colour and/or opacify the polyesters, in particular PET, are metal oxides, such as $TiO_2$, $CoAl_2O_4$ or $Fe_2O_3$, silicates, polysulfides and carbon black. The pigments are particles with a size generally of between 0.1 and 10 µm and predominantly between 0.4 and 0.8 µm. The complete removal of these pigments by filtration, which is necessary in order to envisage recycling the opaque PET, is technically difficult as they have an extremely high clogging capability.

The recycling of coloured and opaque PETs is thus extremely problematic.

For certain applications, as for example the manufacture of PET resin for bottles, comonomers are deliberately added to the formation of the PET during its production, in order to enhance certain properties of the PET and to facilitate its processability. For example, between 0.1% and 10% by weight, preferably between 1% and 5% by weight, of diethylene glycol (DEG), relative to the weight of the PET polyester, may be added.

Patent application US 2006/0074136 describes a process for the depolymerization by glycolysis of coloured PET, in particular resulting from the recovery of green-coloured PET bottles. The feedstock treated by this process takes the form of PET flakes and is contacted with ethylene glycol in a reactor at a temperature between 180 and 280° C. for a number of hours. The product of glycolysis which is obtained at the conclusion of the depolymerization step is purified on activated carbon at a temperature of more than 170° C. and then by extraction of the residual dyes, particularly the yellow dyes, with a solvent, which may be an alcohol such as methanol, or a glycol such as ethylene glycol. The BHET, for its part, crystallizes in the extraction solvent and is then separated by filtration.

In patent application US 2015/0105532, the post-consumer PET, which comprises a mixture of different, coloured PETs, such as clear PET, blue PET, green PET and/or amber PET, in the form of flakes, is depolymerized by glycolysis in the presence of ethylene glycol and of an amine catalyst, in a reactor at 150-250° C., in batch mode. The resulting diester monomer is purified by filtration, ion exchange and/or passage over activated carbon in particular at a temperature of 80-90° C., before being crystallized and recovered by filtration.

In patent EP0865464, the process of depolymerization of polyester, more particularly of coloured polyester, for example green PET, comprises the steps of depolymerization in the presence of a diol in a reactor at a temperature of between 180 and 240° C., optional evaporation in a thin-film evaporator, although there is no particularization of the conditions under which this evaporator must be operated, and dissolution of the mixture in a hot solvent. The hot dilution is followed by a filtration step, which enables the separation of the insoluble impurities with a size of more than 50 µm. The low proportion of pigments in coloured PET allows for separation by filtration. However, this technology cannot operate with the amount of pigments present in opaque PET, these pigments rapidly blocking the filter.

Patent JP3715812 describes the acquisition of refined bis(2-hydroxyethyl) terephthalate (BHET) from PET in the form of flakes. The depolymerization step involves the glycolysis of the PET flakes, which have been pretreated beforehand by washing with water in solid form, with glycol in the presence of ethylene and of a catalyst in a stirred reactor at 180° C. to remove the water, and then at 195-200° C. The depolymerization is followed by a step of prepurification by cooling, filtration, adsorption and treatment on ion-exchange resin, this step being presented as being very important and being carried out before the evaporation of the glycol, and the purification of the BHET. The pre-purification makes it possible to prevent the repolymerization of the BHET in the subsequent purification steps. However, passing through a step of filtration and ion-exchange resin can be extremely problematic when the feedstock comprises a substantial amount of very small solid particles, such as pigments and/or polymeric compounds other than PET, such as, for example, polyolefins and polyamides, as is the case when the feedstock treated comprises opaque PET and/or multilayer preformed PET, especially in sizeable proportions, particularly when the filler comprises more than 10% by weight of opaque PET and/or of multilayer preformed PET.

In parallel, patent EP 1 120 394 discloses a process for depolymerizing a polyester, comprising a step of glycolysis in the presence of ethylene glycol, and a process for purifying a solution of bis(2-hydroxyethyl) terephthalate on a cation-exchange resin and an anion-exchange resin.

Lastly, patent application FR 3053691 describes a process for depolymerizing a polyester feedstock comprising opaque PET and in particular from 0.1% to 10% by weight of pigments, by glycolysis in the presence of ethylene glycol. A purified bis(2-hydroxyethyl) terephthalate (BHET) effluent is obtained after particular steps of separation and of purification. This patent application entertains the possibility of sending some or all of the diol effluent, containing unreacted ethylene glycol, in liquid form to a purification step prior to its recycling, but does not provide details of this step of treatment of the diol effluent, and does not take into account the diethylene glycol which may be present in a not inconsiderable amount in the PET chains as a comonomer and which is generated on the depolymerization of these PET chains.

The aim of the present invention is to perfect these processes for glycolytic depolymerization of the polyester feedstock comprising PET, and more particularly the process of application FR 3053691, in particular so as to improve the recycling of the diol effluent recovered at the conclusion of the glycolysis, via a purification step which is integrated in an optimum way into the depolymerization process. The object of the invention is to obtain a diester stream, more particularly a BHET stream, by depolymerization of a polyester feedstock comprising PET, more particularly coloured and/or opaque PET, with a high purity, while reducing the energy consumption of the process.

SUMMARY OF THE INVENTION

A subject of the invention is therefore a process for depolymerization of a polyester feedstock comprising polyethylene terephthalate (PET), said process comprising, and preferably consisting of:

a) a conditioning step comprising a conditioning section supplied at least with said polyester feedstock, to produce a conditioned stream;

b) a step of depolymerization by glycolysis, which is supplied at least with the conditioned stream, and is conducted at a temperature of between 180 and 400° C., with a residence time of between 0.1 and 10 h, in the presence of diol in a manner such that the total molar amount of diol is adjusted between 1 to 20 mols of diol per mole of diester in said polyester feedstock;

c) a diol separation step, which is supplied at least with the effluent from step b), and is conducted at a temperature of between 60 and 250° C., at a pressure less than that of step b), and which produces at least a gaseous diol effluent, at least a liquid diol effluent and a liquid monomers effluent, where said diol separation step is implemented in a gas-liquid separation section or in a succession of two to five successive gas-liquid separation sections, each producing a gaseous effluent and a liquid effluent, where the liquid effluent from the preceding section supplies the subsequent section, and the liquid effluent obtained from the last gas-liquid separation section forms the liquid monomers effluent, the gaseous effluent(s) obtained from step c) at least in part, form one or more gaseous diol effluent(s), the gaseous effluent(s) obtained from step c), at least in part, is (are) condensed to form one or more liquid diol effluent(s);

d) a step of separation of the liquid monomers effluent obtained from step c) into a heavy impurities effluent and a prepurified monomers effluent, which is conducted at a temperature of less than 250° C. and a pressure of less than 0.001 MPa, with a liquid residence time of less than 10 min, e) a step of decolourization of the prepurified monomers effluent obtained from step d), employing at least one adsorption section comprising at least one adsorber, which is operated in the presence of at least one adsorbent, at a temperature of between 100 and 200° C., to produce a purified monomers effluent, f) a diol purification step, which is supplied with at least a gaseous diol effluent and at least a liquid diol effluent, which are obtained in step c), and which is conducted at a temperature of between 40 and 250° C. and at a pressure of between 0.001 and 0.2 MPa, and which produces, at least, a purified diol effluent and one or more impurities effluent(s).

The present invention enables the acquisition of a diester effluent, more particularly a BHET stream, having a high purity, from a polyester feedstock comprising PET and originating from collecting and sorting divisions, by glycolysis of said polyester feedstock, more particularly of the polyethylene terephthalate, in the presence of diol, more particularly of ethylene glycol (MEG), which is obtained at least partly from a diol effluent recovered at the end of depolymerization and purified before being recycled. One advantage of the invention is therefore the proposal of an optimized process scheme, by coupling a step c) of separation of the unreacted diol and/or the diol liberated during the prior step of depolymerization by glycolysis, with a step f) of purification of said diol, which processes at least one gaseous diol effluent and at least one liquid diol effluent, directly obtained from said diol separation step c), so enabling, in particular, a reduction in the energy consumption of said diol separation and purification steps c) and f), respectively. The energy gain is obtained advantageously by modifying the amounts of gaseous diol effluent and liquid diol effluent that are obtained in the separation step c) and are sent to the purification step f), which is unable to function independently of step c). The process according to the invention therefore enables a reduction in the overall energy consumption of the process.

Another advantage of the invention is to separate the impurities liberated in the depolymerization reaction and carried with the diol into the diol separation step c), so as to obtain a purified diol effluent, which can then be wholly or partly sent to the depolymerization step b) and/or optionally the conditioning step a) and/or the decolourization step e). Indeed, in the depolymerization reaction, compounds lighter than the diester monomer, more particularly BHET monomer, may be liberated and/or formed in the reaction mixture, such as, for example, diethylene glycol (DEG), which may be used as a comonomer in the production of PET, or water, these being optionally present in the polyester feedstock obtained from plastics wastes, or formed in the depolymerization reaction step as a result of secondary reactions such as the etherification of ethylene glycol. These compounds are separated with the diol, more particularly ethylene glycol, in the diol separation step c), and may be detrimental to the performance of the depolymerization step b) and/or may alter the composition of the purified monomers effluent obtained at the conclusion of step e). The process, by recycling a purified diol to the depolymerization section, thus makes it possible to improve the overall performance of the process in terms of the quality of diester product obtained.

Another advantage of the invention is that it is able to process any type of polyester wastes, which increasingly comprise pigments, dyes and other polymers, such as azure, coloured, opaque and multilayer PETs. The process according to the invention is suitable for processing opaque PET, and is able to remove the pigments, dyes and other polymers, and to regain the diester monomer, in particular the BHET bis(2-hydroxyethyl) terephthalate monomer by chemical reaction. This monomer may then be repolymerized to give a polymer which exhibits no difference from a virgin polyester, more particularly a virgin PET, thus allowing access to all of the uses of virgin PET.

LIST OF FIGURES

FIG. 1 represents one particular embodiment of the invention. It schematizes the process detailed in Example 1.

A polyester feedstock (1) comprising opaque PET is conditioned in a step a), in particular at a temperature of 250° C. The conditioned feedstock (2) is introduced into a step b) of depolymerization by glycolysis, which is also supplied with a stream of ethylene glycol (MEG) (10) composed of a fraction of the purified MEG effluent (9) obtained from step f) and of a fresh MEG supplement (17) external to the process. Said depolymerization step is conducted at a temperature of between 220° C. and 250° C. and a pressure of 0.4 MPa.

The reaction effluent (3) obtained is then sent to the diol separation step c), which employs a succession of two flash drums at temperatures of from 180° C. to 120° C. and pressures of 0.04 MPa to 0.004 MPa, followed by a thin-film evaporator which is operated at 175° C. and 0.0005 MPa.

At the conclusion of this evaporation step (step c), a liquid stream and three MEG-rich gaseous streams are recovered. The liquid stream forms the liquid BHET effluent (4), and is sent to the BHET separation step d). The gaseous stream obtained at the outlet of the first flash drum is kept in gaseous form, and forms a gaseous MEG effluent (7). The gaseous stream obtained at the outlet of the second flash drum is condensed and forms a liquid MEG effluent (8). The gaseous stream obtained at the outlet of the thin-film evaporator is also condensed, and forms another liquid MEG effluent (8'). The gaseous MEG effluent (7) and the liquid MEG effluents (8) and (8') are sent to a diol purification step f).

In step d), the liquid BHET effluent (4) is injected into a short-path evaporator, also referred to as short-path distillation, which is operated at a pressure of 20 Pa and heated at 215° C. A prepurified BHET effluent (5) and a heavy impurities effluent (14) are obtained at the outlet of the short-path evaporator. One portion (16) of the heavy impurities effluent (14) is purged, while the other portion (15) of the heavy impurities effluent (14) is recycled to the reaction step (step b). The prepurified BHET effluent (5) is compressed to 0.15 MPa before being sent to a decolourization step e).

Said prepurified BHET effluent (5) is used, in step e), to supply a mixing section, which is operated at 150° C., at a pressure of 0.15 MPa, and which is likewise supplied with a fraction (11) of the purified MEG effluent (9) obtained from the diol purification step f). The flow rate at which said fraction of the purified MEG stream (11) is supplied is adjusted in such a way that said liquid BHET stream represents 50% by weight of the final mixture. The resulting mixture is then used to supply an adsorption section, which consists of two columns each filled with an adsorbent, more particularly an activated carbon, the columns being operated at 150° C., at a pressure of 0.15 MPa. One column is placed on stream, the other remaining in reserve (swing operation). The purified BHET effluent is recovered at the outlet from step e).

The diol purification step f) employs a distillation column comprising a condenser, a reboiler and 30 theoretical plates, and is operated at the top at 0.025 MPa. The gaseous MEG effluent (7) is used to supply the column directly at plate 23. The liquid MEG effluent (8') is compressed to 0.1 MPa and preheated to 112° C. in an exchanger by heat exchange with the residue withdrawn at the bottom of the distillation column. The preheated liquid MEG effluent (8') is then mixed with the liquid MEG effluent (8), compressed beforehand to 0.1 MPa, and then the liquid MEG mixture is used to supply the distillation column at plate 23. A water-rich liquid distillate is withdrawn at the top of the column, after the condenser, at a temperature of 65° C., and forms a light impurities effluent (12). A DEG-rich liquid residue is withdrawn at the bottom of the column, at the reboiler, at a temperature of 200° C., and forms a heavy impurities effluent (13). A purified liquid MEG stream is withdrawn at plate 4 at a temperature of 154° C. and forms a purified MEG effluent (9).

Accordingly, one part (10) of the purified diol effluent (9) may be recycled to the depolymerization reactor (step b) as a mixture with a fresh MEG supplement (17), external to the process, and another part may be sent to the decolourization step (step e).

DESCRIPTION OF THE EMBODIMENTS

According to the invention, polyester terephthalate or poly(ethylene terephthalate), also simply called PET, has a basic repeat unit of formula:

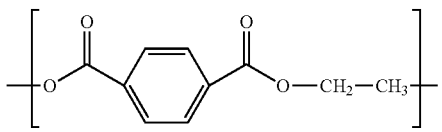

Conventionally, PET is obtained by polycondensation of terephthalic acid (PTA) or dimethyl terephthalate (DMT) with ethylene glycol. In the continuation of the text, the expression "per mole of diester in said polyester feedstock" corresponds to the number of moles of —[O—CO—$(C_6H_4)$—CO—O—$CH_2$—$CH_2$]— unit, which is the diester unit obtained from the reaction of PTA and ethylene glycol, in the PET included in said polyester feedstock.

According to the invention, the term "monomer" or "diester monomer" advantageously denotes bis(2-hydroxyethyl) terephthalate (BHET) of chemical formula $HOC_2H_4$—$CO_2$—$(C_6H_4)$—$CO_2$—$C_2H_4OH$, in which —$(C_6H_4)$— represents an aromatic ring, this being the diester unit obtained from the reaction of PTA and ethylene glycol, in the PET included in said polyester feedstock.

The term "oligomer" typically denotes a polymer of small size, consisting generally of 2 to 20 basic repeat units. According to the invention, the term "ester oligomer" or "BHET oligomer" denotes a terephthalate ester oligomer comprising between 2 and 20, preferably between 2 and 5, basic repeat units of formula —[O—CO—$(C_6H_4)$—CO—O—$C_2H_4$]—, where —$(C_6H_4)$— is an aromatic ring.

According to the invention, the terms "diol" and "glycol" are used without distinction and correspond to compounds comprising 2 —OH hydroxyl groups. The preferred diol is ethylene glycol, also referred to as monoethylene glycol or MEG.

The diol or diol effluent streams employed in the steps of the process of the invention therefore preferably comprise ethylene glycol (or MEG) in an amount of more than 40% by weight of the total weight of said diol or diol effluent stream. They may optionally also comprise diethylene glycol (DEG).

The term "dye" is understood to mean a substance which is soluble in the polyester material and is used to colour it. The dye can be of natural or synthetic origin.

According to the invention, the term "pigment", more particularly opacifying and/or colouring pigment, defines a finely divided substance which is insoluble in particular in the polyester material. The pigments are in the form of solid particles with a size of generally between 0.1 and 10 μm, and predominantly between 0.4 and 0.8 μm. They are often of inorganic nature. The pigments generally used, notably for opacifying, are metal oxides, such as $TiO_2$, $CoAl_2O_4$ or $Fe_2O_3$, silicates, polysulfides and carbon black.

According to the present invention, the expressions "of between . . . and . . . " and "between . . . and . . . " mean that the limiting values of the interval are included in the range of values described. If such were not the case and if the limiting values were not included in the range described, such a clarification will be given by the present invention.

Particular and/or preferred embodiments of the invention may be described hereinafter. They may be implemented separately or combined with one another with no limitation on their combination in so far as such combination is technically feasible.

Feedstock

The process according to the invention is supplied with a polyester feedstock comprising at least one polyester, this being a polymer in which the repeat unit of the main chain contains an ester function, and comprising polyethylene terephthalate (PET), preferably comprising at least coloured and/or opaque and/or multilayer PET, preferably at least opaque PET.

Said polyester feedstock is advantageously a polyester feedstock to be recycled, obtained from the divisions for collecting and sorting waste, more particularly obtained from plastic wastes. Said polyester feedstock may originate, for example, from the collection of bottles, trays, films, resins and/or fibres consisting of polyethylene terephthalate.

The polyester feedstock advantageously comprises at least 50% by weight, preferably at least 70% by weight, more preferably at least 90% by weight of polyethylene terephthalate (PET).

Said polyester feedstock preferably comprises at least one PET selected from opaque, dark or coloured and multilayer PET and mixtures thereof. Very particularly, said polyester feedstock comprises at least opaque PET, preferably at least 10% by weight of opaque PET, very preferably at least 15% by weight of opaque PET, said opaque PET advantageously being opaque PET to be recycled, namely PET obtained from the divisions for collecting and sorting. Said polyester feedstock advantageously comprises between 0.1% to 10% by weight of pigments, advantageously between 0.1% and 5% by weight. It also preferably comprises preferably between 0.05% and 1% of dyes, in particular between 0.05 and 0.2% by weight.

In the divisions for collecting and sorting, the polyester wastes are washed and ground before forming the polyester feedstock of the process according to the invention.

The polyester feedstock may be wholly or partly in the form of flakes, having a maximum length of less than 10 cm, preferably of between 5 and 25 mm, or in a micronized solid form, namely in the form of particles preferably having a size of between 10 microns and 1 mm. The feedstock may further comprise "macroscopic" impurities, preferably less than 5% by weight, more preferably less than 3% by weight, of "macroscopic" impurities, such as glass, metal, plastics other than polyester (for example PP, HDPE, etc.), wood, paper, cardboard or inorganic elements. Said polyester feedstock may also be wholly or partly in the form of fibres, such as textile fibres, optionally pretreated in order to remove cotton or polyamide fibres or any other textile fibre other than polyester, or such as tyre fibres, optionally pretreated in order to remove, in particular, polyamide fibres or rubber or polybutadiene residues. Said polyester feedstock may further comprise polyester obtained from production scraps from processes of polymerization and/or conversion of the polyester material. The polyester feedstock may also comprise elements used as a polymerization catalyst and as stabilizers in PET production processes, such as antimony, titanium and tin.

Conditioning Step a)

Said process according to the invention comprises a conditioning step a), which comprises at least one conditioning section supplied at least with said polyester feedstock, and producing a conditioned stream.

Said conditioning section of step a) enables the heating and pressurization of said polyester feedstock to the operating conditions of the depolymerization step b).

In the conditioning section, the polyester feedstock is progressively heated to a temperature close to or even slightly about its melting point, so as to become at least partly liquid. Advantageously at least 70% by weight of the polyester feedstock, very advantageously at least 80% by weight, preferably at least 90% by weight, more preferably at least 95% by weight of the polyester feedstock is in liquid form at the conclusion of the step a) conditioning section. The temperature at which the conditioning section of step a) is implemented is advantageously of between 150 and 300° C., preferably between 225 and 275° C. This temperature is kept as low as possible, to minimize the thermal degradation of the polyester.

The conditioning section may advantageously be operated under inert atmosphere, to limit the introduction of oxygen into the system and the oxidation of the polyester feedstock.

According to one preferred embodiment of the invention, said conditioning section is an extrusion section, which corresponds to a screw conveying section. In other words, the conditioning section is operated in an extruder.

The residence time in said extrusion section, defined as the volume of said section divided by the volume flow rate of feedstock, is advantageously less than or equal to 5 h, preferably less than or equal to 1 h, more preferably less than or equal to 30 min, very preferably less than or equal to 10 min, and preferably greater than or equal to 2 min. The extrusion section advantageously allows conditioning of the polyester feedstock such that the conditioned stream is at a temperature of between 150 and 300° C., preferably between 225 and 275° C., and at a pressure between the atmospheric pression (i.e. 0.1 MPa) and 20 MPa.

Said extrusion section is advantageously connected to a vacuum extraction system so as to remove impurities, such as dissolved gases, light organic compounds and/or moisture present in the feedstock. Said extrusion section may also advantageously comprise a filtration system for removing solid particles with a size of greater than 40 μm, preferably with a size of less than 2 cm, such as sand particles. The supplying of the polyester feedstock into the extruder is carried out advantageously by any methods known to a person skilled in the art, for example via a feed hopper, and may advantageously be inertized in order to limit the introduction of oxygen into the system.

According to one optional embodiment of the invention, the conditioning section may comprise a conditioning zone, employed advantageously as described above, at a temperature of between 150 and 300° C., preferably between 225 and 275° C., preferably in an extruder, and then a feedstock-diol contact phase in which the polyester feedstock is advantageously contacted with a diol stream, preferably comprising at least a fraction of the purified diol effluent obtained from step f), optionally as a mixture with an external diol supplement and/or a fraction of the liquid diol effluent obtained from step c), preferably such that a number of moles of diol in said diol stream, preferably comprising at least said fraction of the purified diol effluent obtained from step f), optionally as a mixture with an external diol supplement and/or a fraction of the liquid diol effluent obtained from step c), relative to the number of moles of diester in said polyester feedstock, is between 0.05 and 10, preferably between 0.15 and 6.0, more preferably between 0.3 and 3.0. The effect of this contacting is to initiate the depolymerization reaction of the polyester feedstock, before its introduction into the depolymerization step b). It also enables the viscosity of the polyester feedstock to be reduced, therefore facilitating its transport particularly to the depolymerization step b). Said optional feedstock-diol contact phase may be implemented in a static or dynamic mixer. When the conditioning zone is implemented in an extruder, the feedstock-diol contact phase may be implemented within the extruder; in this case, it constitutes a reactive extrusion phase. Preferably, the diol stream, more particularly comprising at least the fraction of the purified diol effluent obtained from step f), optionally as a mixture with an external diol supplement and/or a fraction of the liquid diol effluent obtained from step c), may advantageously be superheated prior to being supplied into the feedstock-diol contact phase, in order to make it easier to bring the polyester feedstock to temperature.

The polyester feedstock may also advantageously be mixed, before or in the conditioning section, with at least a fraction of the heavy impurities effluent obtained from step d).

The conditioned stream obtained from the conditioning section is advantageously sent to the depolymerization step b).

Depolymerization Step b)

The process according to the invention comprises a step of depolymerization by glycolysis, which is supplied at least with the conditioned stream obtained from step a) and which is conducted, in particular in liquid phase, in the presence of diol, advantageously at a temperature of between 180 and 400° C., preferably between 200 and 300° C., more preferably between 210° C. and 280° C., with a residence time in said step b) of between 0.1 and 10 h, preferably between 0.25 and 8 h, more preferably between 0.5 and 6 h, and in a manner such that the total molar amount of diol introduced in step a) and/or b) is adjusted to be between 1 to 20 mols, preferably between 3 to 15 mols, more preferably between 5 to 10 mols of diol per mole of diester in said polyester feedstock (corresponding to a weight ratio of diol introduced in step a) and/or b), relative to the weight of the polyester feedstock, of between 0.3 and 6.7, preferably between 1.0 and 5.0, more preferably between 1.7 and 3.3).

Accordingly, depending on the amounts of diol introduced optionally in step a), during the optional feedstock-diol contact phase, said step b) of depolymerization by glycolysis is optionally supplied with a diol supplement. The optional diol supplement advantageously comprises at least the fraction of the purified diol effluent obtained from step f), optionally as a mixture with an external diol supplement and/or a fraction of the liquid diol effluent obtained from step c). Very preferably, the optional diol supplement is an optional ethylene glycol supplement, advantageously comprising at least a fraction of the purified diol effluent, preferably composed of ethylene glycol (MEG), obtained from step f).

The operating pressure of said step b) is determined so as to keep the reaction system in liquid phase. This pressure is advantageously at least 0.1 MPa, preferably at least 0.4 MPa, and preferably less than 5 MPa. A "reaction system" refers to the collective components and phases present within said step b).

The residence time is defined as the ratio of the volume of liquid in said reaction section to the volume flow rate of the stream emerging from said reaction section.

The diol is advantageously monoethylene glycol.

Said depolymerization step b) is implemented advantageously in one or more reaction sections, preferably at least two reaction sections, more preferably between two and four reaction sections, which operate in series. Each reaction section can be employed in any type of reactor known to a person skilled in the art which makes it possible to carry out a depolymerization or transesterification reaction, preferably in a reactor stirred by a mechanical stirring system and/or by a recirculation loop and/or by fluidization. Said reactor can comprise a conical bottom which makes it possible to bleed off the impurities. Said depolymerization step b) preferably comprises at least two reaction sections, more preferably between 2 and 4 reaction sections, which operate in series, where the reaction section(s), starting from the second reaction section, is or are operated at a mutually identical or different temperature which is lower than or equal to the temperature of the first reaction section, preferably lower, and more preferably lower by 10 to 50° C., or even lower by 20 to 40° C., relative to the temperature of the first operational section.

The glycolysis reaction can be carried out in the presence or absence of a catalyst. When the glycolysis reaction is carried out in the presence of a catalyst, the latter can be homogeneous or heterogeneous and chosen from the esterification catalysts known to a person skilled in the art, such as complexes, oxides and salts of antimony, tin or titanium, alkoxides of metals from Groups (I) and (IV) of the Periodic Table of the Elements, organic peroxides or acidic/basic metal oxides. A preferred heterogeneous catalyst advantageously comprises at least 50% by mass, with respect to the total mass of the catalyst, preferably at least 70% by mass, advantageously at least 80% by mass, very advantageously at least 90% by mass, and more advantageously still at least 95% by mass, of a solid solution consisting of at least one spinel of formula $Z_xAl_2O_{(3+x)}$ in which x is between 0 (limit excluded) and 1, and Z is chosen from Co, Fe, Mg, Mn, Ti and Zn, and comprising at most 50% by mass of alumina and of oxide of the element Z. Said preferred heterogeneous catalyst advantageously contains at most 10% by mass of dopants chosen from silicon, phosphorus and boron, taken alone or as a mixture. For example, and without limitation, said solid solution can consist of a mixture of spinel $ZnAl_2O_4$ and of spinel $CoAl_2O_4$, or else consist of a mixture of spinel $ZnAl_2O_4$, of spinel $MgAl_2O_4$ and of spinel $FeAl_2O_4$, or else consist solely of spinel $ZnAl_2O_4$.

Said depolymerization step is preferably carried out without addition of external catalyst to the polyester feedstock.

Said depolymerization step may advantageously be carried out in the presence of a solid adsorbing agent in powder or shaped form, the function of which is to trap at least part of the coloured impurities, thereby relieving the strain on the decolourization step e). Said solid adsorbing agent is advantageously an activated carbon.

The glycolysis reaction allows the polyester feedstock to be converted into ester oligomers and monomers, and advantageously allows PET to be converted into at least the monomer bis(2-hydroxyethyl) terephthalate (BHET) and oligomers of BHET. The conversion of the polyester feedstock in said depolymerization step is greater than 50%, preferably greater than 70%, in a preferred way greater than 85%. The molar BHET yield is greater than 50%, preferably greater than 70%, in a preferred way greater than 85%. The molar BHET yield corresponds to the molar flow rate of BHET at the outlet of said step b) to the number of moles of diester in the polyester feedstock supplying said step b).

An internal recirculation loop is advantageously employed in step b), that is to say the withdrawing of a fraction of the reaction system, the filtration of this fraction and the reinjection of said fraction into said step b). This internal loop enables the removal of the solid, "macroscopic" impurities possibly present in the reaction liquid.

The depolymerization step b) makes it possible, advantageously, to obtain an effluent, also called reaction effluent, which is sent to a diol separation step c).

Diol Separation Step c)

The process according to the invention comprises a diol separation step c), which is supplied at least with the effluent from step b), and which is operated at a temperature of between 60 and 250° C., at a pressure lower than that of step b), and which produces at least a gaseous diol effluent, at least a liquid diol effluent and a liquid monomers effluent.

The major function of step c) is to recover some or all of the unreacted diol, and also the compounds which are lighter than the monomer and which are liberated or generated in the course of the depolymerization reaction.

Step c) is advantageously conducted at a pressure lower than that of step b), so as to vaporize a fraction of the effluent from step b) to give at least a gaseous effluent and liquid effluent.

Step c) is advantageously implemented in a gas-liquid separation section or a succession of gas-liquid separation sections, advantageously in two to five successive separation sections, very advantageously in three to five successive separations. Each of the gas-liquid separation sections produces a liquid effluent and a gaseous effluent. The liquid effluent from the preceding section supplies the subsequent section. The liquid effluent obtained from the last gas-liquid separation section forms the liquid monomers effluent. Each gaseous effluent produced by one of the gas-liquid separation sections consists advantageously to an extent of more than 40% by weight, preferably more than 50% by weight, more preferably more than 60% by weight, of diol, preferably of ethylene glycol (MEG). The gaseous effluent(s) may also contain other compounds, such as dyes, light alcohols, water or diethylene glycol. At least a gaseous effluent obtained from the succession of gas-liquid separation sections, or at least a fraction of the gaseous effluent obtained from the gas-liquid separation section or of each of the gaseous effluents obtained from the gas-liquid separation sections, is kept in the gaseous state, to form at least one gaseous diol effluent, and is sent directly to the diol purification step f). The gaseous effluent(s) obtained from step c), at least in part, form one or more gaseous diol effluent(s). Step c) preferably produces at least one gaseous diol effluent and preferably up to four gaseous diol effluents. At least one gaseous effluent obtained from the succession of gas-liquid separation sections, or at least a fraction of the gaseous effluent obtained from the gas-liquid separation section or from the succession of gas-liquid separation is condensed to form at least one liquid diol effluent, and preferably up to four liquid diol effluents, which is or are subsequently sent to the diol purification step f). The gaseous effluent(s) obtained from step c), at least in part, is (are) condensed to form one or more liquid diol effluent(s), and preferably up to four liquid diol effluents.

According to one preferred embodiment of the invention, step c) advantageously comprises at least three, preferably three, successive gas-liquid separation sections. The gaseous effluent obtained from the first gas-liquid section forms a gaseous diol effluent and is sent directly to the diol purification step f). The gaseous effluent obtained from the last gas-liquid separation section is condensed to form a liquid diol effluent which is subsequently sent to step f). The gaseous effluent(s) obtained from the gas-liquid separation section(s) between the first and last gas-liquid separation sections may be condensed or kept in the gaseous state, before being sent to the diol purification step f).

When step c) produces a plurality of gaseous diol effluents, the gaseous diol effluents obtained from step c) may be mixed with one another before being supplied to step f), or may be supplied independently to said step f). When step c) produces a plurality of liquid diol effluents, the liquid diol effluents obtained from step c) may be mixed with one another before being supplied to step f), or may independently supply said step f), or else at least one of the liquid diol effluents may directly supply step f), independently or as a mixture, and the other liquid diol effluent(s) may optionally be recycled, in whole or in part, to step a) and/or b) and/or e).

Advantageously, at least one of the gas-liquid separation sections may be implemented in a falling-film evaporator or a thin-film evaporator or a short-path distillation.

Step c) is conducted in such a way that the temperature of the liquid effluents is kept above the value below which the polyester monomer precipitates, and below a high value, dependent on the molar diol/monomer ratio, above which the monomer undergoes significant repolymerization. The temperature in step c) is between 60 and 250° C., preferably between 90 and 220° C., more preferably between 100 and 210° C. Operating in a succession of gas-liquid separations, advantageously in a succession of 2 to 5, preferably of 3 to 5, successive separations is particularly advantageous since it allows the temperature of the liquid effluent to be adjusted in each separation, to meet the aforesaid constraints. It also allows the supplying of the step f) to be spread into one or more gaseous diol effluent(s) and one or more liquid diol effluent(s), so as to limit the energy consumption of the process while optimizing both the separation of the diol and its purification.

The pressure in step c) is advantageously adjusted in order to allow the evaporation of the diol at one temperature, while minimizing the repolymerization and allowing optimum integration in terms of energy. It is generally between 0.00001 and 0.2 MPa, preferably between 0.00004 and 0.15 MPa, more preferably between 0.00004 and 0.1 MPa.

The gas-liquid separation section(s) is (are) advantageously stirred by any method known to a person skilled in the art.

Optionally, some or all of at least one gaseous diol effluent, preferably after condensation, and/or some or all of at least one liquid diol effluent may advantageously be recycled directly to step a) and/or step b) and/or step e), optionally as a mixture with a diol supplement external to the process according to the invention. With preference, all of the gaseous and liquid diol effluents obtained from step c) are sent to the diol purification step f), prior to the recycling of the diol to steps a) and/or b) and/or the use thereof in step e).

Monomer Separation Step d)

The process according to the invention comprises a step d) of separating the liquid monomers effluent obtained from step c) into a heavy impurities effluent and a prepurified monomers effluent.

Said step d) is advantageously conducted at a temperature of less than 250° C., preferably of less than 230° C., and very preferably of less than 200° C., and preferably of more than 110° C., and at a pressure of less than 0.001 MPa, preferably less than 0.0005 MPa, preferably greater than 0.000001 MPa, with a liquid residence time of less than 10 min, preferably less than 5 min, more preferably less than 1 min, and preferably more than 0.1 second.

The objective of this separation step d) is to separate the monomer, more particularly BHET, which is vaporized, from the oligomers not completely converted during the depolymerization step, which remain liquid and therefore also trap the heavy impurities, especially the pigments, and from the unconverted polyester polymer, from other polymers possibly present in the polyester feedstock, and from the polymerization catalysts, while minimizing the loss of monomers by repolymerization. These heavy impurities are found with the oligomers in the heavy impurities effluent. Some oligomers, however, may optionally be entrained with the monomer, especially those having a small size.

Owing to the possible presence in the polyester feedstock of polymerization catalysts, the separation must be carried out with very short liquid residence times and at a temperature of not more than 250° C., so as to limit any risk of repolymerization of the monomer, more particularly of BHET, during this step. A separation by simple atmospheric distillation cannot, therefore, be contemplated.

The separation step d) is advantageously implemented in a separation section comprising a falling-film or thin-film evaporation system or an evaporation system involving short-path distillation with a falling film or with a thin film, more particularly by short-path distillation with a falling film or with a thin film.

A very low operating pressure, advantageously of less than 0.001 MPa, preferably of less than 0.0005 MPa, and preferably of more than 0.000001 MPa, is necessary in order to allow step d) to be operated at a temperature of less than 250° C., preferably less than 230° C., while allowing the monomer to vaporize.

A polymerization inhibitor may advantageously be mixed with the liquid monomers effluent before being used to supply said step d).

A flux may also advantageously be mixed with the liquid monomers effluent before being used to supply said step d), so as to facilitate the removal of the heavy impurities, especially the pigments, at the bottom of the short-path distillation or evaporation system. This flux is required to have a much higher boiling point than the monomer, more particularly than BHET, under the operating conditions of step d). It can, for example, be polyethylene glycol, or PET oligomers.

Said heavy impurities effluent comprises, in particular, pigments, oligomers and optionally unseparated BHET. Said heavy impurities effluent is advantageously recycled, in whole or in part, to the conditioning step a). A portion of said heavy impurities effluent may advantageously be recycled directly in step a) and/or step b), alone or as a mixture with a diol effluent. Said heavy impurities effluent may advantageously undergo at least one purification step, preferably a filtration step, prior to its recycling, so to reduce the amount of pigments and/or other solid impurities. The portion of said separated heavy impurities effluent, having a high pigment content, may advantageously be purged from the process and sent to an incineration system. A fraction of said heavy impurities effluent is preferably recycled to step a) and/or step b) without prior separation of the solid impurities.

Said prepurified monomers effluent obtained from the separation section of step d), is advantageously sent to step e).

Said prepurified monomers effluent obtained from the separating section of step d) may optionally be sent into a gas/liquid separation section, operated in any equipment known to a person skilled in the art, at a temperature of between 100 and 250° C., preferably between 110 and 200° C., and more preferably between 120 and 180° C., and at a pressure of between 0.00001 and 0.1 MPa, preferably between 0.00001 and 0.01 MPa, and more preferably between 0.00001 and 0.001 MPa. In one preferred embodiment of the process, in which the separation step d) is implemented in a system of evaporation by short-path distillation with a falling film or a thin film, said optional gas-liquid separation section is integrated in the evaporation system. Said optional gas-liquid separation section enables the separation of a gaseous diol effluent and a liquid prepurified monomer effluent. Said gas-liquid separation enables a further reduction in the amount of diol, preferably ethylene glycol (MEG), and advantageously in the amount of optional light compounds such as DEG, remaining in the prepurified monomers effluent, or even the removal of the residual diol, by recovering, from said gaseous diol effluent, more than 50% by weight, preferably more than 70% by weight, more preferably more than 90% by weight of the diol and advantageously the optional light compounds possibly entrained in step d) with the prepurified monomer effluent. The amount of monomers entrained in said gaseous diol effluent is preferably less than 1% by weight, more preferably less than 0.1% by weight and more preferably still less than 0.01% by weight, relative to the amount of monomers present in the prepurified monomers effluent. Said gaseous diol effluent is then advantageously condensed, and sent to step f). Optionally, some or all of said condensed diol effluent may be recycled with the diol effluent obtained from step f), to step a) and/or step b) and/or, as a mixture, in step e). Where the process comprises this optional gas-liquid separation section, the stream which is sent to step e) is the liquid prepurified monomers effluent obtained at the conclusion of said optional gas-liquid section.

Decolourization Step e)

The process according to the invention comprises a step of decolourization of the prepurified monomers effluent obtained from step d), to produce a purified monomers effluent.

Said step e) advantageously enables the removal of the residual dyes from the prepurified monomers effluent, more particularly the dyes whose boiling point is less than the cut-off point, namely under the temperature and pressure conditions employed in particular in the monomer separation step d). The reason is that these residual dyes, entrained with the prepurified monomers effluent which they colour, can be effectively removed in this way by adsorption in said step e).

Said step e) advantageously employs at least one adsorption section comprising at least one adsorber and is operated in the presence of at least one adsorbent, and preferably up to five different adsorbents, at a temperature of 100 and 200° C., preferably between 100 and 170° C., and more preferably between 120 and 150° C., and preferably at a pressure of between 0.1 and 1.0 MPa, more particularly between 0.1 and 0.8 MPa and very particularly between 0.2 and 0.5 MPa.

When the adsorption section comprises two or more different adsorbents, said different adsorbents are in a mixture or are placed in series in said adsorption section, preferably in series, and more preferably each of the adsorbents is in different adsorbers (for example reactors or columns) placed in series.

According to the invention, adsorbents are said to be different when their nature and/or their composition and/or their particle size and/or their textural characteristics, such as the pore volume, is/are different. Said adsorbent(s) may be any adsorbent known to a person skilled in the art that has the capacity to trap dyes—such as activated carbons, aluminas and clays. Advantageously, at least one adsorbent is selected from activated carbons.

Said adsorption section is advantageously implemented in flow-through fixed-bed mode, namely in at least one adsorber with a fixed bed of adsorbent(s), more particularly at least one column of adsorbent(s), which may operate in upflow or downflow mode, preferably in upflow mode, or in at least one continuous stirred reactor, also called a "continuous stirring tank reactor" (CSTR). Where the section is implemented in at least one CSTR stirred reactor, the reactor or reactors is or are followed by a filtration system for recovering said adsorbent(s) which is (are) in suspension in the liquid processed. The adsorption section is preferably implemented in flow-through fixed-bed mode.

Advantageously, said adsorption section comprises two or more columns of adsorbent(s) in a fixed bed, more particularly at least two columns of adsorbent(s), preferably between 2 and 4 columns of the same adsorbent, more particularly two columns of the same adsorbent. When the adsorption section comprises two columns of the same adsorbent, one operating mode may be that referred to as "swing", in which one of the columns is on-line while the other column is in reserve. When the adsorbent in the on-line column is spent, this column is isolated, while the column in reserve is placed on-line. The spent adsorbent may then be generated in situ and/or replaced with fresh adsorbent, to be replaced on-line again when the other column has been isolated. Another mode for operating the adsorbent columns is to have at least two columns operating in series; when the adsorbent of the lead column (that is, the first column in the series) is spent, this first column is isolated and the spent adsorbent is either regenerated in situ or replaced with fresh adsorbent. The column is then replaced on-line in the last position in the column series, and so on. This operation is referred to as "lead-lag".

Said step e) also advantageously employs a section for mixing the prepurified monomers effluent obtained from step d) with a diol effluent, preferably a fraction of the purified diol effluent obtained from step f), optionally as a mixture with an external diol supplement and/or a fraction of the liquid diol effluent obtained from step c).

Said mixing section, when present, is preferably situated upstream of the adsorption section. Preferably, the amount of diol effluent, obtained very advantageously from a fraction of the diol effluent obtained from step f), optionally as a mixture with an external diol supplement and/or a fraction of the liquid diol effluent obtained from step c), which is introduced into the mixing section, is adjusted such that the prepurified monomers effluent represents between 20% and 90% by weight, more preferably between 30% and 80% by weight, very preferably between 50% and 75% by weight, of the total weight of the mixture in said mixing section. Said mixing section is advantageously operated at a temperature of between 100° C. and 250° C., preferably between 110° C. and 200° C., and more preferably between 120° C. and 180° C., and at a pressure of between 0.1 and 1.0 MPa, preferably between 0.1 and 0.8 MPa, and more preferably between 0.2 and 0.5 MPa. The diol effluent, preferably the fraction of the diol effluent obtained from step f), optionally as a mixture with an external diol supplement and/or a fraction of the liquid diol effluent obtained from step c), may be heated, prior to said mixing section, preferably to the temperature at which the mixing section is operated. The mixing section advantageously employs a static or dynamic mixer, preferably a static mixer.

The decolourization step e) may also advantageously comprise a phase of regeneration of said adsorbent(s).

The purified monomers effluent obtained at the conclusion of step e) of the process of the invention is virtually colourless, or even colourless, to the eye. The purified monomers effluent is preferably characterized by UV-visible spectrometry in order to identify the presence of absorption bands in the visible range, in other words between 400 and 800 nm. Preferably, the purified monomers effluent is characterized by this method, in other words by UV-visible spectrometry between 400 and 800 nm, at a temperature greater than the melting point of the effluent characterized, in other words in liquid medium, or preferably between 120 and 150° C., and with an optical path length of 5 mm. The purified monomers effluent obtained according to the invention exhibits a spectrum in which there is no significant absorption band (i.e. no band which can be differentiated from the background noise) within the visible wavelength range (i.e. between 400 and 800 nm).

The purified monomer effluent is used advantageously to supply a polymerization step known to a person skilled in the art for producing PET which is indistinguishable from virgin PET, advantageously downstream of the feed point with ethylene glycol, with terephthalate acid or with dimethyl terephthalate, depending on the polymerization step employed. Supplying the purified monomer effluent in a polymerization step makes it possible to reduce, by an equivalent flow rate, the supply of dimethyl terephthalate or of terephthalic acid.

Diol Purification Step f)

The process according to the invention comprises a diol purification step f), which is supplied with at least a gaseous diol effluent and at least a liquid diol effluent, which are obtained from the diol separation step c), and is conducted at a temperature of between 40 and 250° C., preferably between 70 and 220° C., and at a pressure of between 0.001 and 0.2 MPa, preferably between 0.004 and 0.1 MPa, to produce, at least, a purified diol effluent and one or more, preferably one to three, preferably two, impurities effluent(s). Said purified diol effluent contains more than 90% by weight, preferably more than 95% by weight, more preferably more than 99% by weight of diol, said diol being preferably ethylene glycol. Said purification step enables the recovery of more than 80% by weight, preferably more than 90% by weight, more preferably still more than 95% by weight of the diol, said diol being preferably ethylene glycol, contained in the gaseous diol effluent(s) and the liquid diol effluent(s) used to supply said step f).

The main function of step f) is to separate some or all of the impurities entrained with the unreacted diol, preferably ethylene glycol, and separated in step c), and to obtain the required purity for the diol effluent prior to its recycling to step a) and/or step b) and/or step e).

The diol purification step f) comprises at least, advantageously, a purification section, which employs a separation based on difference in volatility, based on gas-liquid separation or based on distillation, preferably based on distillation. According to the invention, the term "distillation" refers to a separation based on difference in volatility, which is carried out preferably in one or more column(s) comprising or otherwise a reboiler and/or a condenser.

Said purification section advantageously comprises at least an impurities separation phase, advantageously a phase for separation of the impurities lighter than the diol, the diol being preferably ethylene glycol, which are contained in the gaseous and liquid diol effluents obtained from step c) and used to supply step f), and a phase of separation of the impurities heavier than the diol, preferably ethylene glycol, that are contained in said gaseous and liquid effluents.

Said purification section, operating preferably by distillation, employs at least one distillation column equipped with internals which are known to a person skilled in the art for carrying out a distilling operation. For example, the distillation column or columns are advantageously equipped with plates or with random packing or structured packing.

According to one preferred embodiment of the invention, said purification section comprises a distillation column, preferably equipped with a condenser at the column top and a reboiler at the column bottom, said column being supplied with at least a gaseous diol effluent and at least a liquid diol effluent, which are obtained from step c), on the same theoretical plate or on different theoretical plates, and produces a distillate effluent which is rich more particularly in light impurities, which is advantageously taken off at the top of the column and forms a light impurities effluent; a residue effluent rich more particularly in heavy impurities, which is advantageously taken off at the bottom of the column and forms a heavy impurities effluent; and a purified diol effluent which is advantageously taken off at the side, between the position at which the distillate effluent and the residue effluent are taken off. In this embodiment, said distillation column advantageously comprises between 10 and 50 theoretical plates, preferably between 15 and 35 theoretical plates.

According to another preferred embodiment of the invention, said purification section comprises at least two distillation columns and preferably up to 4 distillation columns, more preferably two distillation columns, more particularly at least one topping column comprising between 3 and 25 theoretical plates, preferably between 8 and 20 theoretical plates, and enabling the separation of the impurities that are lighter than the diol, the diol being preferably ethylene glycol, and a tailing column comprising between 10 and 50 theoretical plates, preferably between 15 and 35 theoretical plates, which is preferably equipped with a condenser and a reboiler, and which enables the separation of the impurities that are heavier than the diol, the diol being preferably ethylene glycol. The topping column may be positioned upstream of the tailing column, or vice versa. In any case, the distillate taken off at the top of the topping column is a light impurities effluent, and the residue taken off at the bottom of the tailing column is a heavy impurities effluent. Advantageously, at least a gaseous diol effluent, at least a liquid diol effluent or at least a gaseous diol effluent and a liquid diol effluent is or are used to supply the tailing column and/or the topping column, on the same theoretical plate or on different theoretical plates.

The configuration for supplying the distillation column or columns in said purification section with at least a gaseous diol effluent and at least a liquid diol effluent, optionally with staged supply of at least a gaseous diol effluent and of at least a liquid diol effluent, staging meaning that the supply procedures are carried out on different theoretical plates of the distillation column(s) in said purification section, is particularly advantageous, since it enables a reduction in the energy consumption of step f) and, more broadly, of the process, while ensuring optimum purification of the diol effluent, preferably optimum purification of ethylene glycol, with a view to recycling it to steps a) and/or b) and/or e) of the process of the invention.

The purification section f) may advantageously comprise one or more filtration operations. Advantageously, the purification section f) may also comprise a section for decolourization, for example by adsorption on a solid (for example, on activated carbon), in order to remove dyes optionally entrained with the diol.

Advantageously, said step f) may also comprise a section for removal of the volatile organic compounds by thermal or catalytic combustion of said compounds in order to prevent them being discharged to the environment. Non-exhaustively, said section for processing impurities comprises a filtration if there are solid particles present, and a catalytic or non-catalytic combustion system.

The purified diol effluent obtained at the conclusion of step f) of the process according to the invention may then be sent, wholly or partly, to at least steps a), b) and e) of the process according to the invention.

The FIGURE and examples which follow illustrate the invention without limiting its scope.

EXAMPLES

In the examples below, the conditioning a), depolymerization b), monomer separation d) and decolourization e) steps are identical and are described below. The only variation in Example 1 (in accordance with the invention) and Example 2 (not in accordance) is in the diol separation step c) and the diol purification step f). FIG. 1 schematizes the depolymerization process of Example 1, in accordance with the invention.

A polyester feedstock (1) comprising, in particular, 20% by weight of opaque PET is obtained from the collection and sorting divisions, to be processed.

4 t/h of flakes of said polyester feedstock (1) comprising 20% by weight of opaque PET, in turn containing 6.2% by weight of $TiO_2$ pigment, are brought to a temperature of 250° C. (step a) and then injected with 11.5 t/h of ethylene glycol (MEG) (10) obtained from a purified MEG effluent fraction (9) obtained in step f) and from a fresh MEG supplement (17), into a first stirred reactor which is maintained at 250° C., and then into a second and a third stirred reactor, which is maintained at 220° C. (step b). The reactors are maintained at a pressure of 0.4 MPa. The residence time, defined as the ratio of the liquid volume in the reactor to the sum of the liquid volume flow rates entering the reactor, is set at 20 min in the first reactor and 2.1 h in the second and third reactors. At the outlet of the third reactor, the reaction effluent (3) consists of 64.2% by weight of MEG (monoethylene glycol), 25.8% by weight of diester monomer, composed very predominantly of BHET (comprising 95% by weight of BHET or more), 3.1% by weight of DEG (diethylene glycol), 0.48% by weight of water, 0.32% by weight of $TiO_2$, and 6.1% by weight of heavy compounds including dimers and/or oligomers of BHET.

The ethylene glycol present in the reaction effluent (3) is separated by evaporation (step c) in a succession of 2 flash drums at temperatures of from 180° C. to 120° C. and pressures of 0.04 MPa to 0.004 MPa, and of a thin-film evaporator operated at 175° C. and 0.0005 MPa. At the conclusion of this evaporation step (step c), a BHET-rich liquid stream (4) of 5.00 t/h and three MEG-rich gaseous streams are recovered. At the outlet of the first flash drum, a gaseous MEG stream 1 of 8.54 t/h and composed of 96.4% by weight of MEG is recovered. At the outlet of the second flash drum, a gaseous MEG stream 2 of 0.85 t/h and composed of 96.8% by weight of MEG is recovered. At the outlet of the thin-film evaporator, a gaseous MEG stream 3 of 1.11 t/h and composed of 79.4% by weight of MEG is recovered. The BHET-rich liquid stream forms the liquid BHET effluent (4) and consists of 79.7% by weight of BHET diester monomer, 0.17% by weight of MEG, 0.19% by weight of DEG and 1.0% by weight of $TiO_2$ and 18.94% by weight of heavy compounds including dimers of BHET.

The liquid BHET effluent (4) is then injected into a short-path evaporator, also referred to as short-path distillation, which is operated at a pressure of 20 Pa (step d). A hot oil at 215° C. enables the evaporation of the BHET, which is subsequently condensed in the short-path evaporator at 130° C. to give a liquid stream of prepurified BHET (5) corresponding to the prepurified monomers effluent). The residence time in the short-path evaporator is 1 min. The liquid stream of prepurified BHET (5) represents a flow rate of 3.8 t/h and is recovered as distillate from the short-path evaporator. It consists of 99% by weight of BHET diester monomer and is devoid of traces of $TiO_2$. A heavy residue (14), corresponding to the heavy impurities effluent, with a flow rate of 1.2 t/h is recovered as a residue from the short-path evaporator and consists of 18.5% by weight of BHET diester monomer, 77.4% by weight of BHET oligomers and 4.1% by weight of $TiO_2$. One portion (16) of the heavy residue (14) is purged, while the other portion (15) may be recycled to the reaction step (step b).

The gaseous effluent is condensed at 130° C. to give a liquid stream of prepurified BHET (5).

The liquid stream of prepurified BHET (5), containing 99% by weight of BHET diester, is compressed to 0.15 MPa and is sent to the decolourization step e). It is used first to supply a mixing section, which also receives a supply of a fraction (11) of the purified MEG effluent (9) obtained from the diol purification step f). The rate at which said fraction (11) of the purified MEG effluent is supplied is adjusted such that said liquid stream of BHET represents 50% by weight of the final mixture. Said section is operated at 150° C., at a pressure of 0.15 MPa.

The resulting mixture is then used to supply an adsorption section (step e) consisting of two columns, each filled with an adsorbent. The adsorption section is operated at 150° C., at a pressure 0.15 MPa. One column is placed on stream, with the other remaining in reserve. The adsorbent used for packing the two columns is an activated carbon consisting of cylindrical extrudates with a diameter of 0.8 mm, reference ROY 0.8 from Cabot Norit. The residence time is set at 3 h. The purified monomers effluent (6) is obtained at the outlet of the adsorption column.

The colouration of the effluent (6) at the column outlet is monitored by UV-visible spectrometry in situ, with the aid of a UV-visible probe of the Hellma brand, Falcata series, with an optical path length of 5 mm. The colouration is monitored between 400 and 800 nm, via the appearance of a significant absorption band in this wavelength range.

The appearance of a colouration, identified via the appearance of an absorption band around 450 nm, is observed after 7 days. This time defines the operating life of the column, before the stream to be processed is switched to the reserve column.

The column containing the spent adsorbent is either discharged or regenerated before being brought into onstream operation again when the reserve column is spent.

Example 1—in Accordance

In Example 1 in accordance with the invention, the gaseous MEG stream 1 obtained from the first flash drum is not condensed. It forms the gaseous MEG effluent (7).

The gaseous MEG stream 2 obtained from the second flash drum is entirely condensed at 85° C. and 0.0011 MPa to give a liquid MEG effluent (8).

The gaseous MEG stream 3 obtained from the thin-film evaporator is entirely condensed at 72° C. and 0.0004 MPa to give a liquid MEG effluent (8').

The gaseous MEG effluent (7) and the liquid MEG effluents (8) and (8') are sent to a diol purification step f).

The diol purification step f) employs a distillation column comprising a condenser, a reboiler and 30 theoretical plates, and is operated at the top at 0.025 MPa. The gaseous MEG effluent (7) is used to supply the column directly at plate 23. The liquid MEG effluent (8') is compressed to 0.1 MPa and preheated to 112° C. in an exchanger by heat exchange with the residue taken off at the bottom of the distillation column. The preheated liquid MEG effluent (8') is then mixed with the liquid MEG effluent (8), compressed beforehand to 0.1 MPa, and then the liquid MEG mixture is used to supply the distillation column at plate 23.

A water-rich liquid distillate is taken off at the top of the column, after the condenser, at a temperature of 65° C. The water-rich liquid distillate contains 93.5% by weight of water. It forms a light impurities effluent (12).

A DEG-rich liquid residue is taken off at the bottom of the column, at the level of the reboiler, at a temperature of 200° C. The DEG-rich liquid residue contains 95% by weight of DEG. It forms a heavy impurities effluent (13).

A liquid stream of purified MEG is taken off from plate 4 at a temperature of 154° C. The purity of the purified MEG stream is 99.8% by weight of MEG. It forms a purified diol effluent (9).

One part (10) of the purified diol effluent (9) may thus be recycled to the depolymerization reactor (step b) as a mixture (with a fresh MEG supplement (17), external to the process), and another part is sent to the decolourization step (step e).

The energy consumption in terms of hot heat-transfer fluid over the diol separation step c) and diol purification step f) and over the process as a whole is reported in Table 1 below.

TABLE 1

| Energy consumption | Step c) | Step f) | Overall process |
|---|---|---|---|
| MW | 1.72 | 0.92 | 4.02 |

Supplying a gaseous stream and a liquid stream to the distillation column in the diol purification step f) produces a stream of purified MEG containing 99.8% by weight of MEG (ethylene glycol), while at the same time the energy consumption in terms of hot heat-transfer fluid is reasonable, particularly for said step f) (0.92 MW).

Example 2—not in Accordance

In Example 2 not in accordance with the invention, the gaseous MEG stream 1 obtained from the first flash drum is entirely condensed at 140° C. and 0.024 MPa to give a liquid MEG stream 1.

The gaseous MEG stream 2 obtained from the second flash drum is entirely condensed at 85° C. and 0.0011 MPa to give a liquid MEG stream 2.

The gaseous MEG stream 3 obtained from the thin-film evaporator is entirely condensed at 72° C. and 0.0004 MPa to give a liquid MEG stream 3.

The diol purification step f) consists of a distillation column comprising a condenser, a reboiler and 30 theoretical plates, and is operated at the top at 0.025 MPa. The liquid MEG stream 1 and the liquid MEG stream 2 are compressed to 0.1 MPa. The liquid MEG stream 3 is compressed to 0.1 MPa and preheated to 112° C. in an exchanger by heat exchange with the residue taken off at the bottom of the distillation column. The preheated liquid MEG stream 3 is then mixed with the liquid MEG streams 1 and 2, and then the liquid MEG mixture is used to supply the distillation column of the diol purification step f), at plate 23.

A water-rich liquid distillate is taken off at the top of the column, after the condenser, at a temperature of 65° C. The water-rich liquid distillate contains 93.5% by weight of water.

A DEG-rich liquid residue is taken off at the bottom of the column, at the level of the reboiler, at a temperature of 200° C. The DEG-rich liquid residue contains 95% by weight of DEG.

A liquid stream of purified MEG is taken off from plate 4 at a temperature of 154° C. The purity of the purified MEG stream is 99.8% by weight of MEG.

The energy consumption in terms of hot heat-transfer fluid over the diol separation step c) and diol purification step f) and over the process as a whole is reported in Table 2 below.

TABLE 2

| Energy consumption | Step c) | Step f) | Overall process |
|---|---|---|---|
| MW | 1.72 | 2.84 | 6.03 |

Supplying the distillation column of diol purification step f) with a gaseous stream (the gaseous MEG effluent) and a liquid stream (mixture of liquid MEG effluents (8) and (8')), as in the process described in Example 1 in accordance with the invention (4.02 MW of energy consumption in terms of heat-transfer fluid on the part of the overall process), enables a reduction in the overall energy consumption in terms of heat-transfer fluid on the part of the process, relative to a process as described in Example 2 not in accordance (6.03

MW of energy consumption in terms of heat-transfer fluid on the part of the overall process) and in which the distillation column of the diol purification step f) is supplied solely with a liquid stream (mixture of the liquid MEG streams 1, 2 and 3).

The invention claimed is:

1. A process of depolymerization of a polyester feedstock comprising polyethylene terephthalate (PET), said process comprising:
   a) a conditioning step comprising a conditioning section supplied at least with said polyester feedstock, to produce a conditioned stream;
   b) a step of depolymerization by glycolysis, which is supplied at least with the conditioned stream, and is conducted at a temperature of between 18° and 400° C., with a residence time of between 0.1 and 10 h, in the presence of a diol in a manner such that the total molar amount of diol is adjusted to be between 1 to 20 mols of diol per mole of diester in said polyester feedstock;
   c) a diol separation step, which is supplied at least with the effluent from step b), and is conducted at a temperature of between 6° and 250° C., at a pressure less than that of step b), and which produces at least a gaseous diol effluent, at least a liquid diol effluent and a liquid monomers effluent, where said diol separation step is implemented in a gas-liquid separation section or in a succession of two to five successive gas-liquid separation sections, each producing a gaseous effluent and a liquid effluent, where the liquid effluent from the preceding section supplies the subsequent section, and the liquid effluent obtained from the last gas-liquid separation section forms the liquid monomers effluent, the gaseous effluent(s) obtained from step c) at least in part, form one or more gaseous diol effluent(s), the gaseous effluent(s) obtained from step c), at least in part, is (are) condensed to form one or more liquid diol effluent(s);
   d) a step of separation of the liquid monomers effluent obtained from step c) into a heavy impurities effluent and a prepurified monomers effluent, which is conducted at a temperature of less than 250° C. and a pressure of less than 0.001 MPa, with a liquid residence time of less than 10 min,
   e) a step of decolorization of the prepurified monomers effluent obtained from step d), employing at least one adsorption section comprising at least one adsorber, which is operated in the presence of at least one adsorbent, at a temperature of between 10° and 200° C., to produce a purified monomers effluent,
   f) a diol purification step, which is supplied with at least a gaseous diol effluent and at least a liquid diol effluent, which are obtained in step c), and which is conducted at a temperature of between 4° and 250° C. and at a pressure of between 0.001 and 0.2 MPa, and which produces, at least, a purified diol effluent and one or more impurities effluent(s).

2. The process according to claim 1, wherein said polyester feedstock comprises at least 50% by weight of polyethylene terephthalate.

3. The process according to claim 1, wherein said polyester feedstock comprises at least opaque PET.

4. The process according to claim 1, wherein said polyester feedstock comprises between 0.1% and 10% by weight of pigments.

5. The process according to claim 1, wherein step c) is operated at a temperature between 9° and 220° C.

6. The process according to claim 1, wherein the pressure in step c) is between 0.00001 and 0.2 MPa.

7. The process according to claim 1, wherein step c) comprises at least three successive gas-liquid separation sections, where the gaseous effluent obtained from the first gas-liquid section forms a gaseous diol effluent which is sent directly to step f), and where the gaseous effluent obtained from last gas-liquid separation section is condensed to form a liquid diol effluent, which is then sent to step f), and where the gaseous effluent(s) from the gas-liquid separation section(s) between the first and last gas-liquid separation sections is (are) condensed or kept in the gaseous state, before being sent to step f).

8. The process according to claim 1, wherein the diol purification step f) is conducted at a temperature of between 7° and 220° C.

9. The process according to claim 1, wherein the diol purification step f) is conducted at a pressure of between 0.004 and 0.1 MPa.

10. The process according to claim 1, wherein the diol purification step f) comprises a purification section.

11. The process according to claim 10, wherein said purification section comprises a distillation column, which is supplied with at least a gaseous diol effluent and at least a liquid diol effluent, which are obtained in step c), on the same theoretical plate or on different theoretical plates, and which produces a distillate effluent forming a light impurities effluent, a residue effluent forming a light impurities effluent and a purified diol effluent, said distillation column comprising between 10 and 50 theoretical plates.

12. The process according to claim 10, wherein said purification section comprises at least two distillation columns.

13. The process according to claim 1, wherein the conditioning section of step a) is operated in an extruder.

14. The process according to claim 1, wherein the conditioning section of step a) comprises a conditioning zone which is implemented at a temperature of between 150 and 300° C., then a feedstock-diol contact phase in which the polyester feedstock is contacted with a diol stream comprising at least a fraction of the purified diol effluent obtained from step f), optionally as a mixture with an external diol supplement and/or a fraction of the liquid diol effluent obtained from step c), such that the number of moles of diol in said diol stream relative to the number of moles of diester in said polyester feedstock is between 0.05 and 10.

15. The process according to claim 1, wherein said step e) employs a section for mixing the prepurified monomers effluent obtained from step d) with a fraction of the purified diol effluent obtained from step f), optionally as a mixture with an external diol supplement and/or a fraction of the liquid diol effluent obtained from step c), such that the prepurified monomers effluent represents between 20% and 90% by weight of the total weight of the mixture, said mixing section being operated at a temperature of between 10° and 250° C. and at a pressure of between 0.1 and 1.0 MPa.

16. The process according to claim 1, wherein said polyester feedstock comprises at least 70% by weight of polyethylene terephthalate.

17. The process according to claim 1, wherein said polyester feedstock comprises at least 10% by weight of opaque PET.

18. The process according to claim 1, wherein said polyester feedstock comprises between 0.1% and 5% by weight of pigments.

19. The process according to claim 1, wherein step c) is operated at a temperature between 10° and 210° C.

20. The process according to claim 1, wherein the pressure in step c) is between 0.00004 and 0.15 MPa.

21. The process according to claim 1, wherein the diol purification step f) comprises a distillation separation.

22. The process according to claim 10, wherein said purification section comprises a distillation column, which is supplied with at least a gaseous diol effluent and at least a liquid diol effluent, which are obtained in step c), on the same theoretical plate or on different theoretical plates, and which produces a distillate effluent forming a light impurities effluent, a residue effluent forming a light impurities effluent and a purified diol effluent, said distillation column comprising between 15 and 35 theoretical plates.

23. The process according to claim 10, wherein said purification section comprises a topping column comprising between 3 and 25 theoretical plates, and a tailing column comprising between 10 and 50 theoretical plates, where a light impurities effluent is withdrawn at the top of the topping column and a heavy impurities effluent is withdrawn at the bottom of the tailing column.

24. The process according to claim 1, wherein the conditioning section of step a) is operated in an extruder with a residence time of less than or equal to 5 h and greater than or equal to 2 min, at a temperature of between 15° and 300° C., and at a pressure of between 0.1 MPa and 20 MPa.

25. The process according to claim 1, wherein the conditioning section of step a) comprises a conditioning zone which is implemented at a temperature of between 225 and 275° C., then a feedstock-diol contact phase in which the polyester feedstock is contacted with a diol stream comprising at least a fraction of the purified diol effluent obtained from step f), optionally as a mixture with an external diol supplement and/or a fraction of the liquid diol effluent obtained from step c), such that the number of moles of diol in said diol stream relative to the number of moles of diester in said polyester feedstock is between 0.15 and 6.0.

26. The process according to claim 1, wherein said step e) employs a section for mixing the prepurified monomers effluent obtained from step d) with a fraction of the purified diol effluent obtained from step f), optionally as a mixture with an external diol supplement and/or a fraction of the liquid diol effluent obtained from step c), such that the prepurified monomers effluent represents between 30% and 80% by weight of the total weight of the mixture, said mixing section being operated at a temperature of between 10° and 250° C. and at a pressure of between 0.1 and 1.0 MPa.

* * * * *